Nov. 7, 1961     O. H. GRISWOLD     3,007,206
METHODS OF MOLDING THERMOPLASTIC SHEETS
Filed May 6, 1955     5 Sheets-Sheet 1

INVENTOR.
OWEN H. GRISWOLD
BY
ATTORNEYS

Nov. 7, 1961     O. H. GRISWOLD     3,007,206
METHODS OF MOLDING THERMOPLASTIC SHEETS
Filed May 6, 1955     5 Sheets-Sheet 2

INVENTOR.
OWEN H. GRISWOLD
BY
ATTORNEYS

Nov. 7, 1961  O. H. GRISWOLD  3,007,206
METHODS OF MOLDING THERMOPLASTIC SHEETS
Filed May 6, 1955

INVENTOR.
OWEN H. GRISWOLD
BY
*Isler and Ornstein*
ATTORNEYS

Nov. 7, 1961 — O. H. GRISWOLD — 3,007,206
METHODS OF MOLDING THERMOPLASTIC SHEETS
Filed May 6, 1955 — 5 Sheets-Sheet 4

INVENTOR.
OWEN H. GRISWOLD
BY
ATTORNEYS

Nov. 7, 1961  O. H. GRISWOLD  3,007,206
METHODS OF MOLDING THERMOPLASTIC SHEETS
Filed May 6, 1955  5 Sheets-Sheet 5

INVENTOR.
OWEN H. GRISWOLD
BY
*Isler and Ornstein*
ATTORNEYS

United States Patent Office 3,007,206
Patented Nov. 7, 1961

3,007,206
METHODS OF MOLDING THERMOPLASTIC SHEETS
Owen H. Griswold, 681 Beechwood Drive, Westwood, N.J.
Filed May 6, 1955, Ser. No. 506,445
1 Claim. (Cl. 18—56)

This invention relates generally to methods of molding thermoplastic sheets, but has reference more particularly to the production of plastic articles for advertising and display purposes.

A primary object of the invention is to provide a method of molding thermoplastic sheets, in which the "blush" or haze, formed when steam and cooling water are used in the molding process, is avoided.

Another object of the invention is to provide a method of the character described, in which a faster and more uniform heating and cooling of the molded sheets or articles are obtained than in molding methods heretofore available or used.

A further object of the invention is to provide a method of the character described, which is characterized by a more practical and complete thermal control system than has heretofore been used in such molding processes, whereby greater surface detail is attainable in the molded articles.

A still further object of the invention is to provide improved methods of forming and assembling articles or displays for three-dimensional advertising or display purposes.

Other objects and advantages of my invention will be apparent during the course of the following description.

In the accompanying drawings forming a part of this specification and in which like numerals are employed to designate like parts throughout the same, FIG. 1 is a view illustrating more or less diagrammatically the first phase or step of the plastic sheet molding operation;

Figure 1:
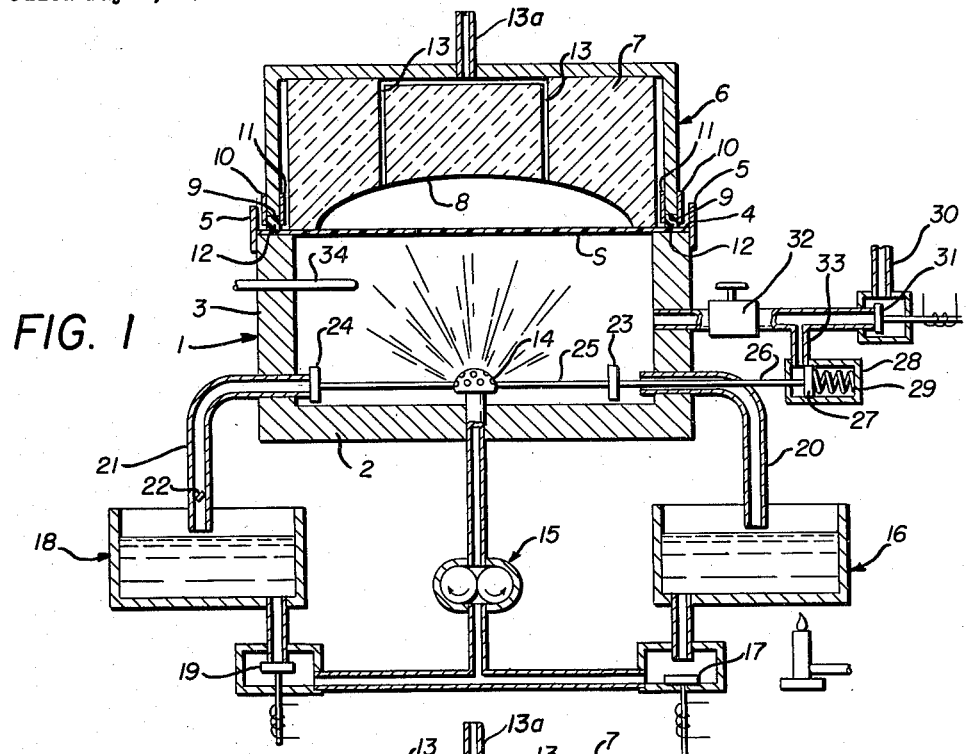
Figure 2:
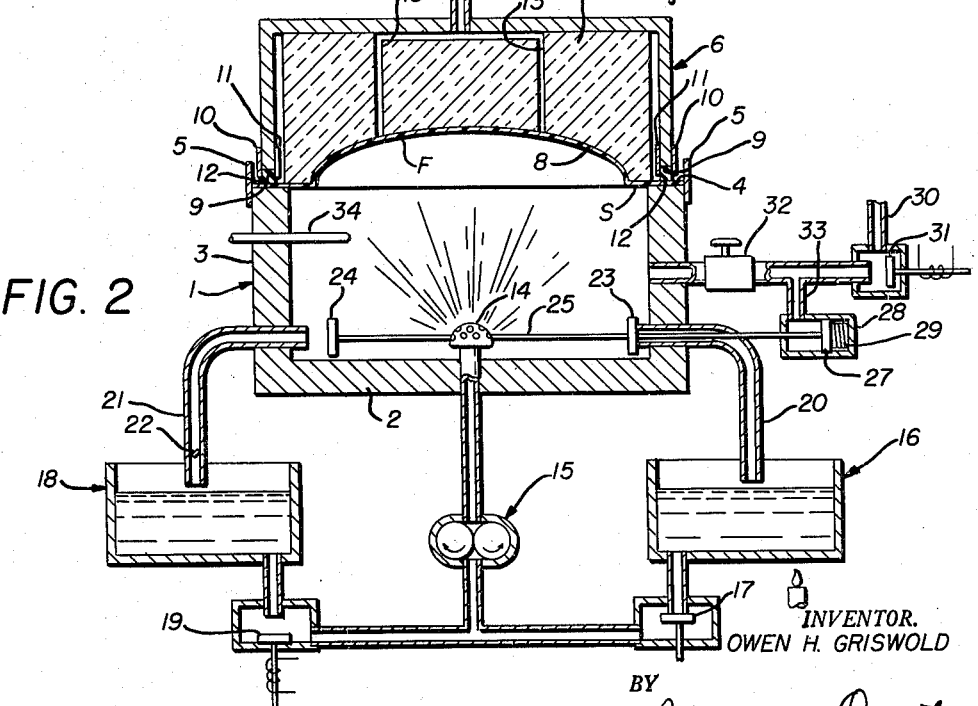
FIG. 2 is a view similar to FIG. 1, but showing the second phase or step of the plastic sheet molding operation.

Referring more particularly to FIGS. 1 and 2 of the drawings, there is disclosed a tray or box 1 which is of appreciable depth and is provided with a bottom 2 and sides 3, upon the upper edges 4 of which the sheet S of plastic material which is to be formed, drawn or molded, is disposed, the sheet S being confined against lateral displacement by means of a guide 5 which is secured to the sides 3 and projects above the edges 4. The guide 5, in this case, is a rectangular frame which provides a register guide for the plastic sheet.

The apparatus further includes a mold box or frame 6, which has secured therein, in any desired manner, a mold 7, of plaster or other material, which has a mold cavity 8. The mold frame or box has secured thereto adjacent its lower edge 9, spaced retainer plates 10 and 11, between which a rubber pressure strip 12 is clamped, this pressure strip being adapted to resiliently bear upon the marginal portions of the plastic sheet, so as not only to hold the sheet in position during the forming operation, but also to provide a seal between the plastic sheet and the box 1. The mold frame and mold are provided at suitably spaced points with air vents 13, which communicate with an outlet nipple 13a.

Disposed within the tray 1, adjacent the center of the bottom 2 is a conical spray nozzle 14, which is adapted to spray hot or cold oil directly against the lower surface of the plastic sheet S.

The oil is suppled to the nozzle 14 by means of a pump 15, operating at a pressure of from about 50 to 90 pounds per square inch. The pump receives hot oil from a hot oil reservoir 16 through a solenoid-actuated valve 17, and receives cold oil from a cold oil reservoir 18 through a solenoid-actuated valve 19.

The tray 1 is also provided with a drainage conduit 20 which conducts warm oil from the tray to the reservoir 16, and with a drainage conduit 21 which conducts cool oil and air from the tray to the reservoir 18, the conduit 21 being provided adjacent its outlet end with a throttle valve 22.

The inlet end of the conduit 20 is adapted to be closed by a valve 23, and the inlet end of the conduit 21 is adapted to be closed by a valve 24, the valves 23 and 24 being interconnected by a rod 25. The rod 25 is provided with an extension 26 which is provided with a piston 27 disposed in an air cylinder 28. The piston 27 is normally urged into the position shown in FIG. 1 by a compression coil spring 29, and when the piston is in this position, the valve 23 is fully open, and the valve 24 is fully closed.

Air under pressure is supplied from a conduit 30 through a solenoid-actuated valve 31, and through a pressure regulator 32 to the interior of the tray 1, a branch conduit 33 being also provided for admitting air into one end of the cylinder 28.

The forming operation will now be described.

Figure 3:
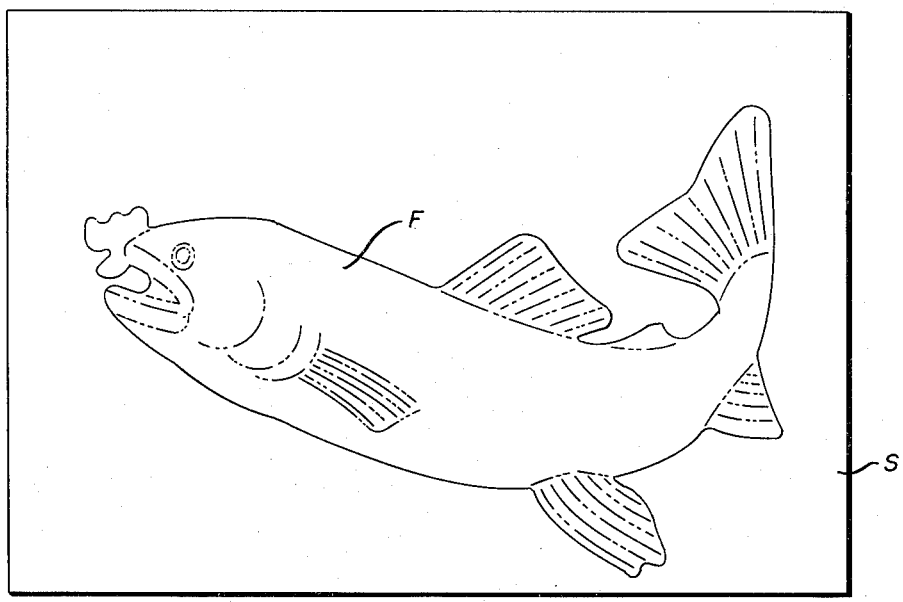
FIG. 3 is a plan view of a plastic sheet which is to be molded.
Figures 4, 5:
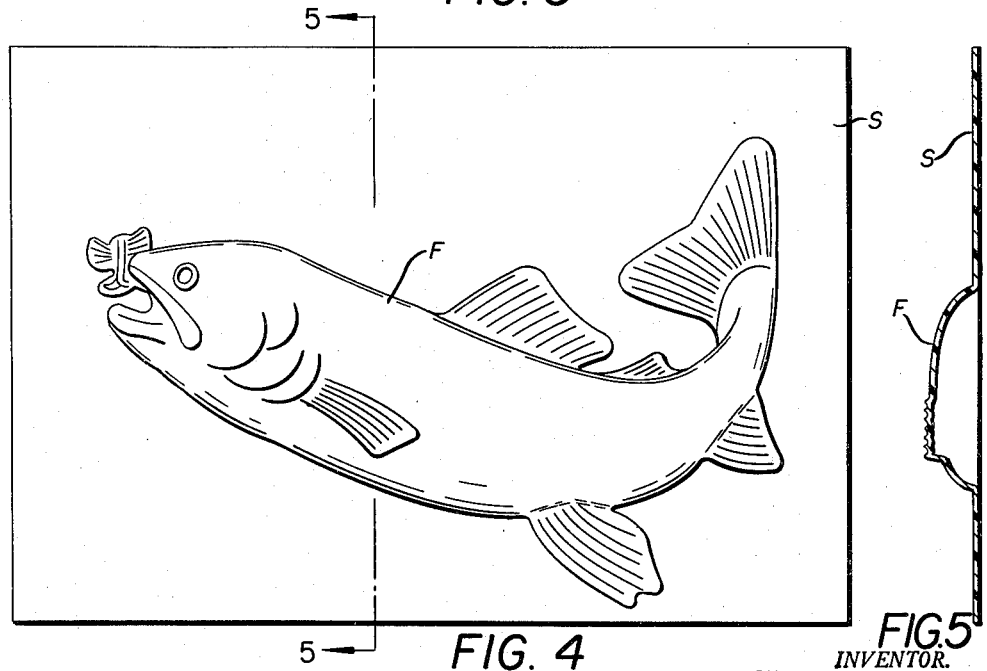
FIG. 4 is a view similar to FIG. 3, but showing the molded sheet.
FIG. 5 is a cross-sectional view, taken on the line 5—5 of FIG. 4.

The flat plastic sheet S, which has the portion thereof which is to be drawn or forced into the mold cavity printed or lithographed thereon, is placed on the edges 4 of the tray 1, the register frame 5 facilitating the placement of the sheet. In this instance, the printed or lithographed portion represents a fish, as indicated by reference character F in FIGS. 3, 4 and 5.

The mold frame 6 is then positioned as shown in FIG. 1, and is clamped to the tray 1 in any suitable manner to maintain its register with the guide 5 and the sheet S.

With the various parts of the apparatus in the positions shown in FIG. 1, the heating phase of the forming operation or cycle is begun. In this phase, the air supply from the conduit 30 is cut off by the valve 31, the valve 23 is fully open (due to the pressure of the spring 29), and the valve 19 fully closed.

Hot oil from the reservoir 16 is pumped by the pump 15 through the nozzle 14, and is thus sprayed directly and uniformly against the lower surface of the plastic sheet S, uniformly heating the sheet to the desired forming temperature. During this heating operation, the hot oil runs down the sides of and across the bottom of the tray 1, and is drained through the conduit 20 into the reservoir 16.

When the desired forming temperature has been attained, one of the thermostats 34 actuates a relay, which, in turn, actuates the solenoid valve 31 to open the latter, thereby admitting air under pressure to the tray, and, at the same time, admitting air into the cylinder 28. This forces the piston 27 rearwardly against the pressure of the spring 29, to the position shown in FIG. 2, in which position, the valve 23 is fully closed and the valve 24 fully open. At the same time, the valve 17 is fully closed and the valve 19 fully opened by the same relay.

In this cooling phase of the cycle, which is diagrammatically illustrated in FIG. 2, the air pressure is maintained sufficiently high to cause the portion F of the plastic sheet to be forced into the mold cavity 8 and into contact with the wall of the cavity, thereby becoming molded to the contour of said wall. At the same time, cold oil from the reservoir 18 is pumped by the pump 15 through the nozzle 14, and is thus sprayed directly and uniformly against the lower surface of the molded plastic sheet, uniformly cooling the sheet. Enough air is supplied to the tray, even though some air is exhausted with the cold oil through the conduit 21 and throttle valve 22. In this way, pressure is maintained while the cold oil is exhausted. The air pressure is thus applied at the inception of the cooling phase and is maintained to the end of the cycle. Cooling is accomplished by the cold oil richocheting against the plastic sheet and by conduction through the plastic and to the mold which is maintained at a temperature slightly less than that at which the plastic softens.

When the molded sheet has cooled to a point at which it is rigid, the mold may be opened, and the molded plastic sheet removed.

If desired, the molded plastic sheet may be ejected from the mold by means of air admitted into the nipple 13a and vents 13.

After the molded sheet has been removed from the mold, the flat portion of the sheet S, around the molded portion F, is removed by die-cutting, and a cardboard or similar backing C (see FIG. 6) is glued to the base edge of the portion F, thereby providing an article which can be attached to a display board or large rectangular cardboard, usually 2' x 3', for three-dimensional advertising and like purposes.

By using hot oil as a heating and cooling medium and air as a forming medium, a number of distinct advantages are obtained, including the following:

(a) In forming certain types of clear plastic, such as acetate and butyrate, which are cheaper than vinyl plastics, "blush" or haze which destroys the transparency and appearance of the plastic, is avoided. Such "blush" or haze is formed when steam and cooling water are used in the molding process.

(b) Spraying provides faster and more uniform heating and cooling than the use of a solid system in the molding operation, as shown, for example, in the Helwig Patent 2,123,552.

(c) The thermal control system which is used in the present process is more practical than the limited control system of Helwig. With thermal control, higher pressures may be used to give surface detail.

Figure 7:
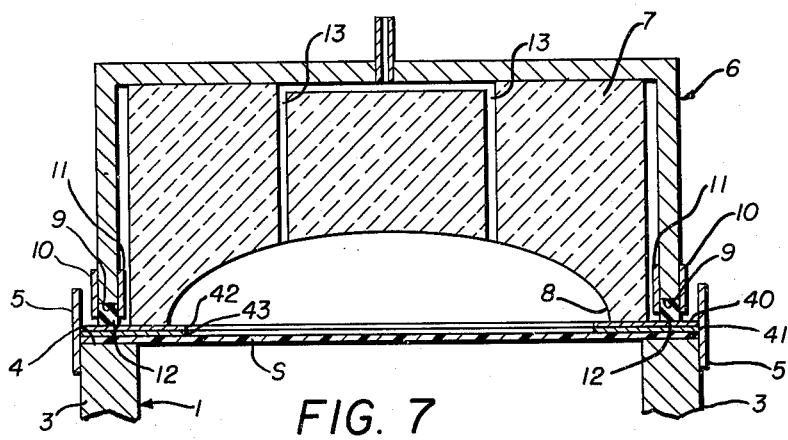
FIG. 7 is a fragmentary view, similar to FIG. 1, but illustrating a modification in the molding operation.

In FIG. 7 to 10 inclusive, a modification is shown in which two aluminum plates 40 and 41, about .040" thick, are cut out to provide registering openings 42 and 43 respectively, which are of a contour corresponding to the contour of the entrance to the mold cavity 8, but somewhat smaller in area than said mold cavity entrance. This provides lips on the aluminum plates which overhang the entrance to the mold cavity, when the aluminum plates are positioned in the guide frame 5, above the plastic sheet S, as shown in FIG. 7.

Figure 8:
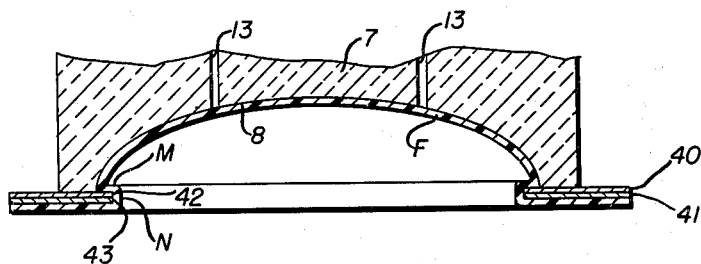
FIG. 8 is a view similar to FIG. 2, but of the modified operation.

During the molding operation, the plastic sheet is formed, as shown in FIG. 8, that is to say, flanges M and N are formed.

Figure 9:
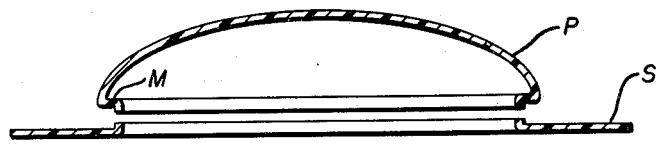
FIG. 9 is a view illustrating a step in the manufacture of the molded article.
Figure 10:
FIG. 10 is a view showing the completed article, as made by the steps shown in FIGS. 7, 8 and 9.

The molded piece is then removed from the mold, with the plates 40 and 41, and a thin saw blade, having a knife-edge, is passed between the plates and through the flange N, thereby cutting the molded piece into two parts, as shown in FIG. 9. In thus cutting the molded piece into two parts, the plastic and plates are sufficiently resilient to allow the saw blade to pass between them without permanently distorting the molded plastic piece.

The molded piece P, as shown in FIG. 9, is thus provided with an inturned base flange M, which may be used to retain the cardboard backing C (FIG. 10) without the necessity of gluing the cardboard backing to the molded piece, and without the necessity of die cutting to remove the flat portion of the molded sheet. In other words, the cardboard backing may be snapped into the position shown in FIG. 10, whereas gluing requires precise fitting of the cardboard backing to the base of the molded piece, and clamping thereof to the molded piece until the glue hardens or sets. This is a distinct advantage, from a production standpoint. Moreover, the finished product is greatly improved in appearance, since the inturned base flange M creates a "shadow line," which makes the molded piece stand out from the surface on which it is mounted. Elimination of die cutting reduces the capital investment in heavy presses and additional handling from the molding department to the die cutting department, then to the finishing department for the insertion of backs. By the present process, the mold operator can cut off the base portion of the molded piece by means of a saw adjacent the molding machine, while the next piece is being molded, after which the cardboard backing is snapped into place, and the product thus quickly finished.

Figure 6:
FIG. 6 is a view illustrating a step in completing the molded article.
Figure 11:
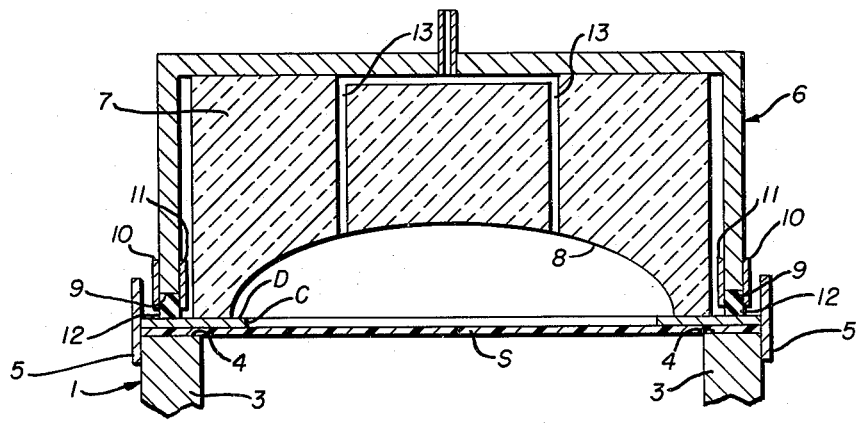
FIG. 11 is a view similar to FIG. 7, but showing still another modification in the molding operation.
Figure 12:
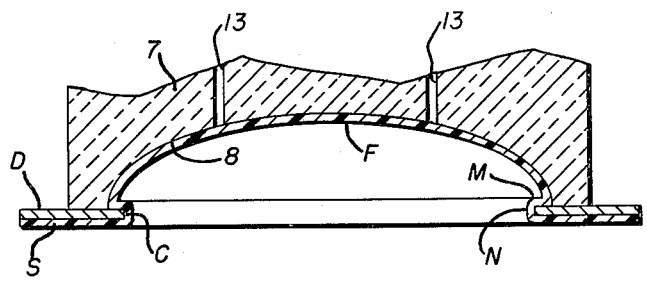
FIG. 12 is a view similar to FIG. 8, but of the modified operation.
Figure 13:
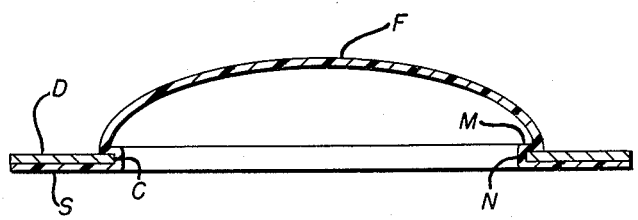
FIG. 13 is a view illustrating the completed article, as made by the steps shown in FIGS. 11 and 12.

In FIGS. 11, 12 and 13, a further modification in the process is shown in which the 2' x 3' display cardboard, to which reference has been made in connection with FIG. 6, and which is designated by reference character D in FIG. 11, is provided with a die-cut opening C which is of a contour corresponding to the entrance to the mold cavity 8 but is somewhat smaller in area than said mold cavity entrance. This provides a lip on the display cardboard which overhangs the entrance to the mold cavity, when the cardboard is positioned in the guide frame 5, above the plastic sheet S, as shown in FIG. 11.

During the forming operation, the plastic sheet is formed, as shown in FIG. 12, that is to say, flanges M and N are formed, which with the flat portion S of the sheet, embrace the edge of the display cardboard D about the opening C.

When the combined molded sheet S and the display cardboard D are removed from the mold, they appear as shown in FIG. 13, in cross-section. This modification of the process results in a unit in which the formed plastic piece is locked directly to the display cardboard, and greatly reduces the overall cost of the finished product, since no additional work is required subsequent to the molding operation.

The molding process which has been described, and which utilizes hot oil as a heating medium for the plastic sheet, and cold oil as a cooling medium is, as previously stated, of especial advantage in forming certain types of clear plastic, such as acetate and butyrate, which are cheaper than vinyl plastics, and where "blush" or haze is to be avoided. However, in molding vinyl plastic sheets and other plastics, where such "blush" or haze is not a problem, a modification of the process may be employed, in which steam is utilized as a heating medium and cold water as a cooling medium. Such a modification of the process is illustrated in FIG. 14 of the drawings.

Figure 14:
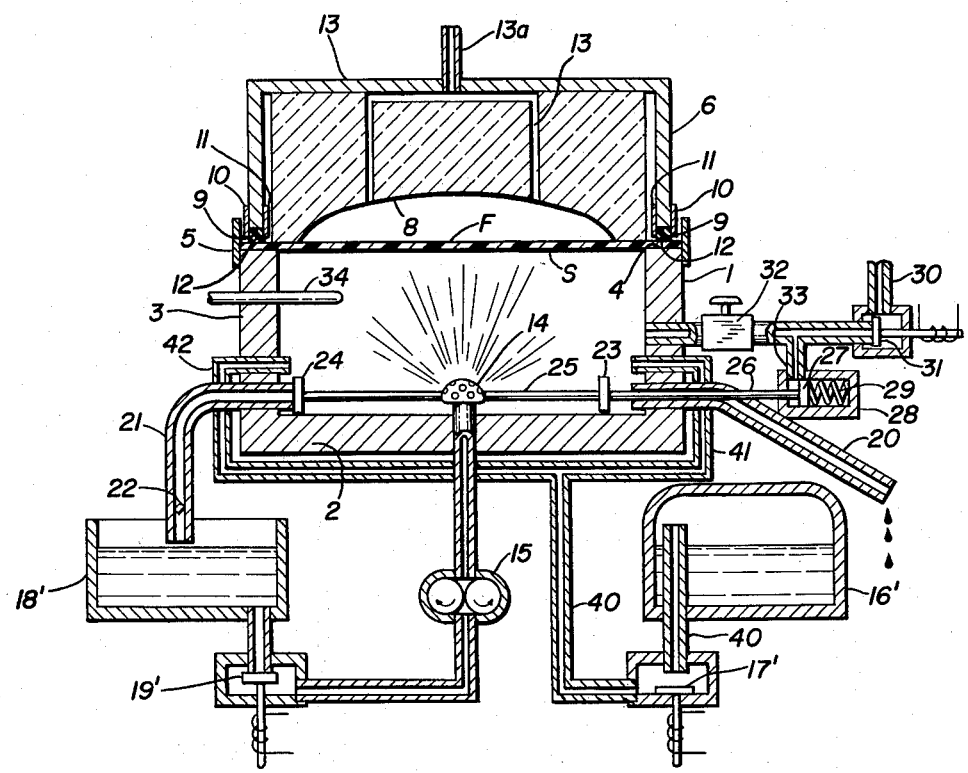
FIG. 14 is a view similar to FIG. 1, but illustrating a modified molding process, in which steam and water are employed.

Referring to FIG. 14, reference numeral 20' designates a waste conduit which extends from the tray or box 1 and is adapted to conduct the condensed steam to a waste receptacle.

Reference numeral 16' designates a steam generator, and 40 a conduit for conducting the steam from the generator through conduits 41 and 42 into the sides of the tray or box 1. The flow from the conduit 40 is controlled by a solenoid-actuated valve 17'. Reference numeral 18' designates a cold water reservoir, the flow from which is controlled by a solenoid-actuated valve 19'.

During the heating phase of the forming operation, the air supply from the conduit 30 is cut off by the valve 31, the valve 23 is fully open (due to the pressure of the spring 29), and the valve 19' is fully closed. Steam from the generator 16' flows through the valve 17' which is fully open, through the conduits 41 and 42 and into the box 1, uniformly heating the sheet to the desired forming temperature. The condensate runs down the sides of and across the bottom of the tray 1, and is drained through the waste conduit 20'.

When the desired forming temperature has been attained, one of the thermostats 34 actuates a relay, which, in turn, actuates the solenoid valve 31 to open the latter, thereby admitting air under pressure to the tray, and, at the same time, admitting air into the cylinder 28. This forces the piston 27 rearwardly against the pressure of the spring 29, so as to fully close the valve 23 and fully open the valve 24. At the same time, the valve 17' is fully closed and the valve 19' fully opened by the same relay.

In this cooling phase of the cycle, the air pressure is maintained sufficiently high to cause the portion F of the plastic sheet to be forced into the mold cavity 8 and into contact with the wall of the cavity, thereby becoming molded to the contour of said wall. At the same time, cold water from the reservoir 18' is pumped by the pump 15 through the nozzle 14, and is thus sprayed directly and uniformly against the lower surface of the molded plastic sheet, uniformly cooling the sheet. Enough air is supplied to the tray, even though some air is exhausted with the cold water through the conduit 21 and throttle valve 22. In this way, pressure is maintained while the cold water is exhausted. The air pressure is thus applied at the inception of the cooling phase and is maintained to the end of the cycle. Cooling is accomplished by the cold water richocheting against the plastic sheet and by conduction through the plastic and to the mold which is maintained at a temperature slightly less than that at which the plastic softens.

When the molded sheet has cooled to a point at which it is rigid, the mold may be opened, and the molded plastic sheet removed.

In the various processes which have been described, instead of using air pressure to form the sheet, the forming may be accomplished by suction applied to the upper surface of the sheet, or by any method in which a differential in air pressure above and below the sheet is utilized.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claim.

Having thus described my invention, I claim:

The method of molding thermoplastic sheets which comprises the steps of confining a plastic sheet against a mold having a mold cavity, interposing between the mold and said sheet a pair of plates having registering openings similar in contour to the entrance to said mold cavity, said registering openings being smaller in area than said entrance whereby a portion of the surface of one plate is exposed to said mold cavity, spraying a heated liquid against the surface of said sheet remote from said cavity to heat the sheet to an elevated temperature, thereafter spraying a cooling fluid against the surface of the sheet remote from said cavity to cool the sheet and, concurrently therewith, subjecting the sheet to gas pressure to deform a portion of the sheet through said registering openings of said plates onto the surface of the mold and including the surface of the plate exposed to said mold cavity and then severing the deformed portion of said sheet from the remainder thereof by a cutting operation in which a cutting tool having a cutting edge passes between said plates.

References Cited in the file of this patent

UNITED STATES PATENTS

| | | |
|---|---|---|
| 1,737,874 | Busch | Dec. 3, 1929 |
| 2,082,715 | Nadai | June 1, 1937 |
| 2,230,189 | Ferngren | Jan. 28, 1941 |
| 2,298,364 | Gits et al. | Oct. 13, 1942 |
| 2,362,672 | Sloan | Nov. 14, 1944 |
| 2,367,642 | Helwig | Jan. 16, 1945 |
| 2,487,233 | Gerke | Nov. 8, 1949 |
| 2,493,439 | Braund | Jan. 3, 1950 |
| 2,558,309 | Mitten | June 26, 1951 |
| 2,691,797 | Bertleff et al. | Oct. 19, 1954 |

FOREIGN PATENTS

| | | |
|---|---|---|
| 474,001 | Great Britain | Oct. 25, 1937 |